United States Patent

Niklasson et al.

(10) Patent No.: US 8,530,807 B2
(45) Date of Patent: Sep. 10, 2013

(54) MICROWAVE OVEN AND RELATED METHOD

(75) Inventors: Olle Niklasson, Finspong (SE); Ulf Nordh, Norrkoping (SE); Fredrik Hallgren, Kolmarden (SE); Hakan Carlsson, Norrkoping (SE)

(73) Assignee: Whirlpool Corporation, Benton Harbor, MI (US)

( * ) Notice: Subject to any disclaimer, the term of this patent is extended or adjusted under 35 U.S.C. 154(b) by 253 days.

(21) Appl. No.: 12/850,704

(22) Filed: Aug. 5, 2010

(65) Prior Publication Data

US 2011/0114633 A1    May 19, 2011

(30) Foreign Application Priority Data

Nov. 18, 2009  (EP) ..................... 09176349

(51) Int. Cl.
  *H05B 6/50*  (2006.01)
(52) U.S. Cl.
  USPC .......................... 219/704; 219/678
(58) Field of Classification Search
  USPC ................................ 219/704, 678
  See application file for complete search history.

(56) References Cited

U.S. PATENT DOCUMENTS

| 3,867,607 | A | * | 2/1975 | Ohtani ......................... 219/748 |
| 4,210,795 | A | | 7/1980 | Lentz |
| 4,415,789 | A | | 11/1983 | Nobue et al. |
| 4,714,812 | A | * | 12/1987 | Haagensen et al. ........... 219/697 |
| 6,867,402 | B1 | * | 3/2005 | Schulte ......................... 219/704 |

FOREIGN PATENT DOCUMENTS

WO    03/007929 A1    1/2003

OTHER PUBLICATIONS

European Patent Application No. 09176349.0, filed Nov. 18, 2009, European Search Report No. EP2326141A1, published May 25, 2011.

* cited by examiner

*Primary Examiner* — Matthew Reames
*Assistant Examiner* — Benjamin Tzu-Hung Liu
(74) *Attorney, Agent, or Firm* — Diederiks & Whitelaw PLC

(57) ABSTRACT

A method of operating a microwave oven and a microwave oven are disclosed. The microwave oven comprises a magnetron for providing microwave power to heat a load placed in the microwave oven, and a solid-state microwave generator for providing microwave power to sense presence and/or determine nature of the load in the microwave oven.

20 Claims, 6 Drawing Sheets

MICROWAVE OVEN AND RELATED METHOD

BACKGROUND OF THE INVENTION

1. Field of the Invention

The present invention relates to a microwave oven and a method of operating a microwave oven.

2. Description of the Related Art

A typical microwave oven includes a cavity for receiving a load to be heated. Microwave energy is generated by means of a magnetron, and the magnetron is operatively connected by a waveguide to feeding ports for feeding microwave energy into the cavity.

Various efforts have previously been made to determine the presence and/or nature of a load placed in the cavity. One reason for determining the presence and/or nature of a load in the cavity is that strong reflection from the cavity typically occurs when the cavity is empty. Such reflection may deteriorate or even destroy the magnetron. For example, WO 03/07929 discloses a method in which a microwave signal escaping from an orifice placed in the wall of the cavity is measured, and the measured signal is used for determining presence and/or nature of a load in the cavity. In case the measured signal corresponds to a level above a level considered safe for the magnetron, the oven is stopped.

Another purpose for determining presence and/or nature of a load in the cavity is to adapt or select the heating cycle in response to such determination. For example, U.S. Pat. No. 4,210,795 discloses a method for regulating the output power of a magnetron in a microwave oven, wherein the reflection coefficient within a feeding waveguide is measured and a control signal is generated to switch the magnetron between first and second levels of power output when the reflection coefficient reaches a predetermined value indicating that a food item in the oven has begun to defrost.

However, the predictability or resolution of these prior methods for determining the presence and/or nature of a load in the microwave cavity is low, thereby limiting the benefits of using these methods in practice, for example in domestic microwave ovens.

SUMMARY OF THE INVENTION

It has now been recognized that the use of tunable signal sources, such as solid state microwave generators (SSMGs) can greatly improve the resolution and predictability when determining presence and/or nature of a load in the cavity of a microwave oven.

While magnetrons are the predominant type of microwave generators used in most microwave ovens, solid-state microwave generators (SSMGs) have previously been proposed for use in microwave ovens. From an operational point of view, SSMGs differ from the traditionally used magnetrons by being tunable both in frequency and output power, thus giving more versatility in determining the presence and/or nature of a load placed in the oven cavity by allowing also a frequency dependent measurement.

One advantage that has also been expected from the use of SSMGs in microwave ovens is the possibility to improve the coupling of microwave energy into the microwave cavity by tuning the SSMG to an appropriate microwave frequency. For example, U.S. Pat. No. 4,415,789 discloses a microwave oven comprising a solid state variable frequency microwave power source. Detector means provide a detector signal indicative of the electric field intensity of the oven cavity when the cavity is loaded and energized, and control means control the operating frequency of the microwave power source according to the detector signal to obtain a maximum electric field intensity within the cavity.

However, SSMGs suffer from a major drawback in that the available output power per unit of money is severely limited compared to that obtainable from magnetrons. Another way of expressing this drawback is that the cost per watt of output microwave power is still today high for SSMGs compared to traditional magnetrons.

The present invention seeks to mitigate, alleviate or eliminate one or more of the above-mentioned deficiencies and disadvantages singly or in combination. In particular, it would be desirable to achieve a microwave oven that is capable of providing one or more of the advantages obtained by utilizing SSMGs in microwave ovens, while at the same time enabling magnetrons to be used for heating a load placed in the microwave oven. For achieving a given amount of output microwave power, such magnetrons are in general associated with lower cost compared to SSMGs.

According to the present disclosure, a magnetron is used in a microwave oven for providing microwave power for heating a load contained in the oven, while an SSMG is used for providing microwave power for sensing presence and/or determining nature of the load.

The SSMG may be operated during time periods when there is no microwave output from the magnetron, in order to avoid microwave power generated by the magnetron to interfere with or otherwise disturb the microwave signal generated by the SSMG.

As another example, the SSMG may be operated as an initial step in a heating cycle in order to determine the presence and/or nature of a load in the microwave oven. Based on the result of the SSMG-based load sensing, an appropriate heating program may be selected. Generally, the magnetron senses the presence and/or determines the nature of the load resulting from the operation of the SSMG. For example, the magnetron will not be switched on if it is determined that there is no load in the microwave oven or, alternatively, the magnetron will be switched on during a limited period of time (for example one minute) such that the magnetron does not become damaged.

As another example, the SSMG may be operated during idle time periods in the magnetron operation cycle, i.e., at times the magnetron is switched off because less than full power has been selected for the heating cycle.

Alternatively, the SSMG may be operated during the half mains periods when there is no emission from the magnetron, i.e., when there is no current through the magnetron.

One or more pulses of microwave power may be supplied from the SSMG during time periods when the magnetron is not supplying microwaves. The starting time and/or duration of these pulses may be synchronized with the time periods when the magnetron is not supplying microwaves. The amount of microwave power reflected from the cavity and/or the microwave field measured in the cavity, e.g., by field sensors, in response to the pulses of microwave power supplied from the SSMG may be utilized for the purpose of recognizing the characteristics of the load in the microwave oven (or recognizing the absence/presence of a load in the microwave oven).

The pulses of microwave power from the SSMG may be of short duration and/or of low power compared to the microwave power output from the magnetron intended for heating the load. Magnetrons for microwave heating typically output microwaves intermittently, because the operation of the magnetron is cycled in order to provide less than maximum average power, and/or because the microwave power output from the magnetron is pulsed since the electrical system feeding the magnetron typically includes a half-wave voltage doubler, as is described in more detail in the following description.

The above embodiments of the present disclosure combine the improved load sensing capabilities allowed by the tunable SSMG with the high power properties of the magnetron. By operating the SSMG during time periods when the magnetron is not emitting any microwaves, the load sensing capabilities of the SSMG may not be disturbed or "drowned" by the comparatively high power output of the magnetron.

Since the SSMG-based load sensing can be performed during an ongoing heating cycle, adaptive operation of the microwave oven with respect to the state or condition of the load may be enabled. The heating cycle of the microwave oven can be adjusted, for example, when the load thaws or boils. Thus, the present invention enables the detection of the readiness of the load and can therefore avoid overheating of the load.

In the context of the present disclosure, "mains" refers to an alternating current (AC) electrical power supply, e.g., for the operation of household and commercial electrical appliances and lighting.

In the context of the present disclosure, "mains period" refers to the inverse of the frequency at which the AC current is supplied from a source via the mains to an end user.

The microwave oven may be structured and arranged such that microwaves generated by the SSMG and microwaves generated by the magnetron are propagated by means of different feeding structures for guiding microwaves. The microwave oven may be configured such that microwaves generated by the SSMG and the magnetron are supplied to the cavity of the microwave oven via different feeding structures (e.g., one or more waveguides or transmission lines, such as coaxial cables or strip lines).

By feeding microwaves generated by the SSMG to the cavity of the microwave oven via one or more dedicated feeding structures, the load sensing capabilities are not limited by the placement of the feeding ports for the microwaves from the magnetron (which preferably are optimized for efficient and uniform heating).

For example, the SSMG may be operatively connected to a feeding port through which microwaves may be fed into the cavity of the microwave oven by means of coaxial cables, strip lines or the like.

When the SSMG is activated for feeding microwaves into the cavity, a measuring unit may measure the amount of reflected microwave power from the cavity and/or the microwave field produced in the cavity. A processing unit may then compare the output from the measuring unit with a load reference signal data set. Alternatively, or in addition, the processing unit may compare the output from the measuring unit with an output from the measurement unit obtained earlier during the operation cycle of the microwave oven, which typically may be the initial measurement made by the measuring unit. The processing unit may then, based on such types of comparison, produce an indication of presence and/or nature of the load.

In this manner, the sensing of presence and/or determination of the nature of the load may be performed in a relatively quick manner by utilizing reference data already available during an ongoing heating cycle.

The load reference signal data set can include a reference corresponding to a substantially empty cavity (i.e. no load present therein) and references corresponding to loads comprised of different foodstuffs, fluids, liquids, etc., as well as the nature thereof, e.g., frozen or thawed.

The load reference data set can be stored in a memory unit integrated directly or indirectly (i.e. via one or more intermediate electric components) with the processing unit.

The SSMG may be arranged such that the microwaves fed into the cavity have a controllable or tunable frequency.

The measuring unit may be arranged such that the reflected microwave power is measured as a function of the frequency of the microwaves fed into the cavity.

The measuring unit may be embodied as one or more microwave field sensors placed inside the microwave cavity for the direct measurement of the cavity field produced by the SSMG.

On the basis of the determined nature of the load, a control unit may adjust one or more of a set of parameters for controlling operation of the microwave oven. The SSMG based load determining operation can be performed during an ongoing heating cycle of the microwave oven, and andaptive operation of the microwave oven with respect to the state or condition of the load may be enabled. The nature of the load may be determined repeatedly during an ongoing heating cycle of the microwave oven wherein the heating cycle may be adjusted or stopped as the load changes from one state to another state, e.g., from frozen to thawed.

A user interface may be adapted to enable a user to select one or more of a set of parameters for controlling operation of the microwave oven. The SSMG may provide microwave power such as to feed microwaves into the cavity in the microwave oven. A measuring unit may produce a measurement signal corresponding to microwave power reflected from the interior of the cavity and/or a measured microwave field inside the cavity. A processing unit may associate the measurement signal with the one or more selected parameters and store the measurement signal and the one or more selected parameters associated with the signal in a memory unit.

The user interface may be further adapted to indicate to the user one or more of a set of parameters for controlling operation of the microwave oven. Such indication can be visual and/or auditory.

In this manner, the user can store operation parameters in the microwave oven, e.g., for defining a heating cycle of the microwave oven, for a particular type of load, i.e., for a type of load that is frequently heated in the microwave oven. The first time the user wants to heat such a type of (frequently heated) load, the SSMG is operated to measure an amount of microwave power reflected from the cavity (or microwave power field produced in the cavity) representative of the particular type of load and thereby obtain a corresponding measurement signal (also representative of the load). The measurement signal and the operation parameters entered by the user are associated and then stored in the memory unit. The next time the user wants to heat a similar type of load, operation of the SSMG enables recognition of the type of load (as the measurement signal is rather similar to the measurement signal obtained the first time) and the operation parameters entered at the first time by the user are retrieved for operation of the microwave oven.

In addition to the user-defined heating programs described above, heating cycle parameters may be predefined during design of the microwave oven in order to provide the user with a set of basic heating programs.

After the one or more operation parameters have been stored, the parameters may be recalled prior to or during an ongoing heating cycle of the microwave oven to adapt the operation of the microwave oven to the particular type of load disposed in the microwave oven.

Thus, the processing unit may be configured to compare the value of an electrical signal corresponding to reflected microwave power and/or measured microwave field with electric signal values stored in the memory unit. The control unit may be configured to adjust one or more of a set of parameters for controlling operation of the microwave oven in accordance with the one or more parameters associated with the electric signal whose value is stored in the memory unit.

BRIEF DESCRIPTION OF THE DRAWINGS

Exemplifying embodiments of the present invention will be described in the following with reference to the accompanying drawings, on which.

In the accompanying drawings, the same reference numerals denote the same or similar elements throughout the views.

DETAILED DESCRIPTION OF THE PREFERRED EMBODIMENTS

Figure 1:
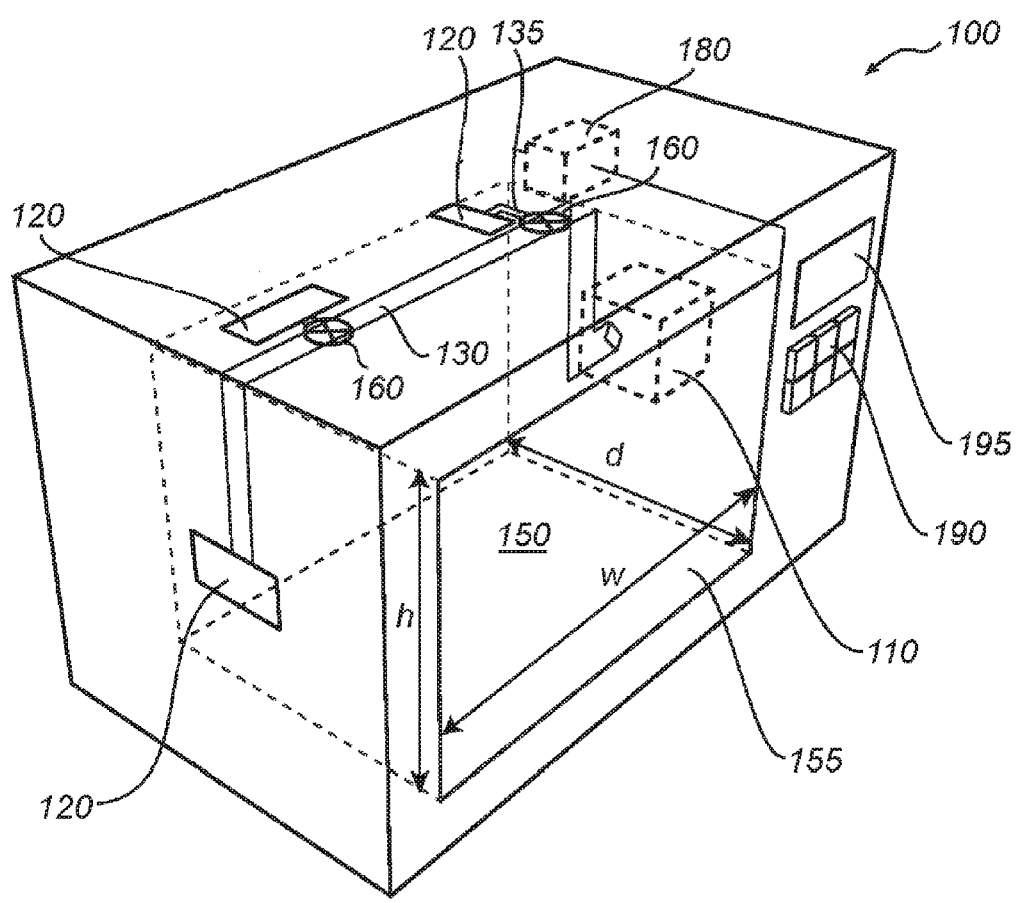
FIG. 1 is a schematic view of a microwave oven according to an exemplifying embodiment of the present invention.
Figure 1:
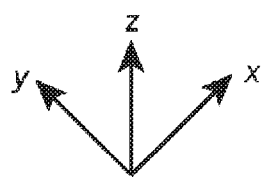

While concepts of the present disclosure are susceptible to various modifications and alternative forms, specific exemplary embodiments thereof have been shown by way of example in the drawings and will herein be described in detail. The present disclosure may, however, be embodied in many different forms and should not be construed as limited to the embodiments set forth herein; rather, these embodiments are provided by way of example so that this disclosure will be thorough and convey the scope of the invention to those skilled in the art. The steps of any method disclosed herein do not have to be performed in the exact order disclosed, unless explicitly stated.

With reference to FIG. 1, there is shown a microwave oven 100 according to an exemplifying embodiment of the present disclosure.

The microwave oven 100 comprises a cavity 150 defined by an enclosing surface. One of the sides of the cavity 150 has an opening 155 for enabling the introduction of a load, e.g. food and/or liquids, into the cavity 150. Further, the cavity 150 is provided with at least one feeding port 120 through which microwaves may be fed into the cavity 150 of the microwave oven 100.

Although the cavity 150 of the microwave oven 100 described with reference to FIG. 1 comprises a rectangular enclosing surface such that the cavity 150 has a depth d, a height h and a width w, the cavity 150 of the microwave oven 100 is not limited to such a shape and may for instance instead exhibit a circular or semi-circular cross section.

The microwave oven 100 further comprises a microwave source 110 connected to the feeding port or aperture 120 of the cavity 150 by means of a feeding structure for guiding microwaves generated by the microwave source 110 to the feeding port 120. The feeding port 120 may be arranged at, in principle, any walls of the cavity 150.

The feeding structure may comprise at least one main waveguide or transmission line 130 and, optionally, a plurality of secondary waveguides or transmission lines 135, branching from the main waveguide or transmission line 130, for guiding the microwaves from the microwave source 110 to the feeding port(s) 120.

Although the cavity 150 described with reference to FIG. 1 comprises more than one feeding port 120 for transmitting microwaves into the cavity 150, the cavity 150 may alternatively be provided with a single feeding port 120 only.

Further, such as illustrated in FIG. 1, the microwave oven 100 may comprise switches 160, wherein each switch 160 is associated with a respective feeding port 120, arranged in the transmission line 130 for enabling to controllably stop the feeding of microwaves into the cavity 150 from a respective feeding port 120.

Figure 2:
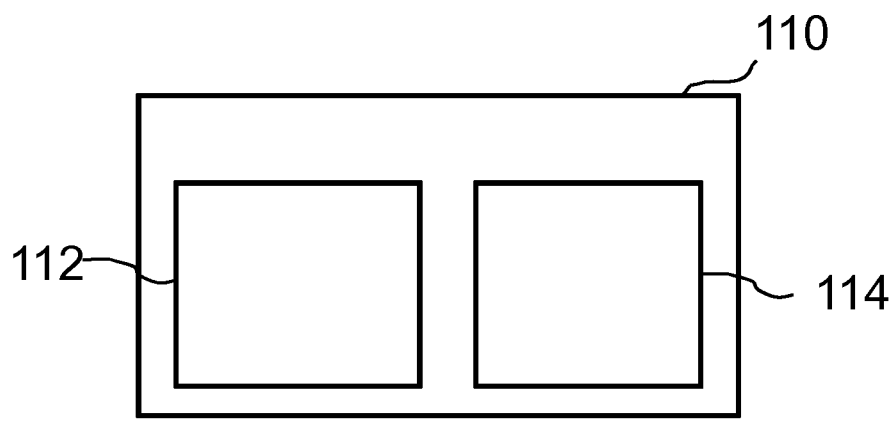
FIG. 2 is a schematic block diagram of a microwave source comprised in a microwave oven in accordance with the embodiment described with reference to FIG. 1.

Referring now to FIG. 2, there is shown a schematic block diagram of the microwave source 110 comprised in the microwave oven 100 described with reference to FIG. 1.

The microwave source 110 comprises a magnetron 112 and a solid-state based microwave generator (SSMG) 114 comprising, for instance, silicon carbide (SiC) and/or gallium nitride (GaN) components. Other semiconductor components may also be adapted to constitute the SSMG 114.

In addition to controlling the frequency of the generated microwaves, the advantages of an SSMG may also include controlling the output power level of the SSMG and an inherent narrow-band feature. The frequencies of microwaves that are emitted from an SSMG typically constitute a narrow range of frequencies such as 2.4 to 2.5 GHz. However, the present disclosure is not limited to such a range of frequencies and the SSMG 114 could for example be adapted to emit in a range centered at 915 MHz, for instance in the range 875-955 MHz, or in any other suitable range of frequency (or bandwidth). The present disclosure may be applicable for sources having mid-band frequencies of 915 MHz, 2450 MHz, 5800 MHz and 22.125 GHz.

With further reference to FIGS. 1 and 2, the microwave oven 100 may comprise a measuring unit or the like (not shown in FIG. 1, cf. FIG. 3) configured to measure a signal reflected from the cavity 150 as a function of the operating frequency of the SSMG 114. Microwaves transmitted into a cavity may be absorbed by the load (if present in the cavity), absorbed by elements comprised in the cavity or other objects present in the cavity, or reflected back from the cavity (or feeding port).

The measuring unit is configured such that the reflected signal measured by the measuring unit is representative or indicative of the microwave energy reflected from the cavity 150. For example, the switches 160 may comprise the measuring unit for measuring the microwave power that is reflected from a feeding port 120. Alternatively, the measuring unit may be field sensors arranged inside the cavity for measuring the microwave field produced in the cavity during operation of the SSMG. The measurements obtained by the measuring unit may then be transmitted to a control unit 180 (explained in more detail in the following) that for example may utilize the results of the measurements in order to control the operation of the microwave oven and the magnetron.

If the feeding port 120 and the cavity 150 are not properly coupled, some microwave power may be reflected back through the feeding port 120 and back into the transmission line 130. The microwave power that is reflected from a feeding port 120, e.g., at a switch 160 may be measured to check whether there is a satisfactory coupling between the feeding port 120 and the cavity 150. The level of the signal reflected at the feeding port 120 may depend on the frequency of the transmitted microwaves.

The microwave oven 100 may be provided with push buttons and/or knobs, as indicated by the reference numeral 190 in FIG. 1, for setting operation parameters for controlling operation of the microwave oven 100, for example cooking function and length of a heating cycle, as well as a display unit 195 for displaying information to a user, e.g., information about the ongoing heating cycle and/or heating program.

Figure 3:
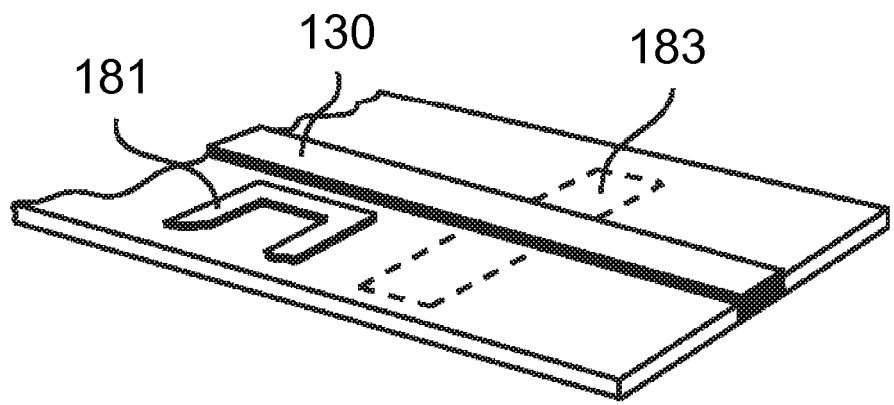
FIG. 3 is a schematic view of an implementation for measuring reflected microwaves from the oven cavity.

FIG. 3 shows an exemplifying arrangement for measuring the microwave power that is reflected from a feeding port wherein a single feeding port comprises a slot 183 in the ground plane. A directional coupler 181 is arranged adjacent to the transmission line 130, which is up-stream of, the slot 183. The directional coupler 181 is in the form of a line that runs parallel to the transmission line 130 across a distance which corresponds to about a quarter of the wavelength of the microwaves propagating in the transmission line 130. Potential microwave power associated with microwaves that propagate up-stream of the slot 183 will thus be disconnected via the directional coupler 181 and may subsequently be measured.

With further reference to FIGS. 1 and 2, the microwave oven 100 comprises a control unit 180 for controlling the operation of the microwave source 110. For example, the control unit 180 may control properties (such as frequency and power) of the microwaves transmitted into the cavity 150 by the SSMG 114. The control unit 180 is connected to the microwave source 110 and the measuring unit such that the microwave source 110 sweeps its frequency across the allowable bandwidth and the measuring unit 162 measures the signal reflected from the cavity 150.

Figure 4:
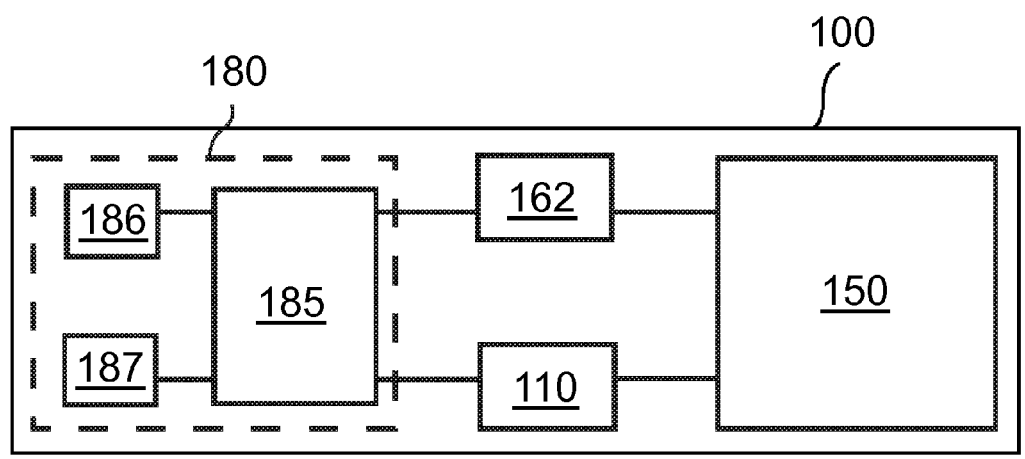
FIG. 4 is a schematic block diagram of a microwave oven according to an exemplifying embodiment of the present invention, illustrating the general functions of the embodiment.

The general function of the microwave oven of the present disclosure is further illustrated in FIG. 4, wherein a block diagram of a microwave oven 100 in accordance with an exemplifying embodiment of the present disclosure is shown. The microwave generator 110 is configured to feed microwaves to the cavity 150, by means of an SSMG for sensing presence and/or determining nature of a load arranged in the cavity of the microwave oven and a magnetron for heating the load (cf. FIG. 2 and the description referring thereto). The signal reflected from the cavity 150 is measured by the measuring unit 162 and the measured signal is transmitted to the control unit 180. The control unit 180 may comprise a processor or processing unit 185 for analyzing or processing the measured signal received at the control unit 180. The control unit 180 further comprises a memory unit or storage medium 186 for storing data, e.g., data generated by the measuring unit 162. For synchronization of the measurements in relation to, or within, the operation cycle of the microwave oven, the microwave oven 100 may further comprise a clock system 187.

The memory unit 186 does not have to be comprised in the control unit 180, but can be arranged as a separate unit directly or indirectly (i.e. via one or more intermediate electric components) connected to the control unit 180.

The measuring unit 162 may either be integrated as a sub-unit in the control unit 180 or be arranged as a separate unit connected to the control unit 180. The latter arrangement is depicted in FIG. 4.

According to the present invention, a magnetron 112 is utilized in the microwave oven 100 for providing the microwave power required to heat a load contained in the cavity 150 of the microwave oven 100. Such as has been described in the foregoing with reference to FIGS. 1, 2 and 4, the magnetron 112 may be comprised in a microwave source 110, which further comprises an SSMG 114. However, and as will be readily understood, the SSMG and the magnetron may be positioned at different locations in the microwave oven.

The magnetrons used in microwave ovens can have different nominal output powers, but the maximum microwave output power may be around 1000 W. During use, it is often desired to operate the microwave oven at a power lower than the maximum microwave power. Operation of a microwave oven at a power lower than the maximum power can be achieved by the microwave oven by operating the magnetron in a cycle where the magnetron is turned on (i.e. emits microwave power) during only part of the cycle. For example, a magnetron capable of providing 900 W of microwave power can be used to provide 600 W of average power by using a duty cycle of ⅔, i.e. using a cycle in which the magnetron emits microwaves during two thirds of the cycle and is idle or inactive during one third thereof.

In the context of some embodiments of the present disclosure, "duty cycle" refers to the fraction of time that the magnetron is in an "active" state, i.e. a state in which the magnetron emits microwaves.

During the magnetron's idle time in the operation cycle, i.e., when no microwaves are emitted into the cavity, an SSMG can be used according to the present disclosure in order to probe or sense the presence and/or nature of the load in the cavity. The load sensing using the SSMG may be performed at a selected microwave power that is low compared to the magnetron output power. However, if suitable high power SSMGs should be available, the load sensing could be performed at powers comparable to the magnetron output. If the output power from the SSMG is not negligible compared to the magnetron output power, the magnetron duty cycle may be adjusted in order to obtain the selected average microwave power in the cavity. However, it is expected that, in most cases, the contribution of the SSMG to heating of the load is negligible.

A microwave oven may include a transformer for providing the high voltage feeding that is required for the operation of the magnetron, and a rectifier for converting the alternating mains current into a direct current for the magnetron. The electrical system feeding the magnetron may include a half-wave voltage doubler. During operation of a half-wave voltage doubler. A capacitor is charged during a first half-wave of the mains frequency and the capacitor is discharged during a second half-wave of the mains frequency. During the first half-wave, i.e., during the capacitor charging time, there is no current through the magnetron (no emission from the magnetron), while twice the transformer voltage is achieved during the second half-wave. In other words, the voltage doubler produces an output only during one half of the transformer output (mains) frequency. Consequently, the magnetron output during normal operation of the microwave oven is pulsed, with a frequency of about 50 or 60 pulses per second (depending on the mains frequency). According to an embodiment of the present disclosure, the SSMG may be operated for load sensing during the "time slots" in this pulsing when the magnetron is not emitting, i.e., during the time when the capacitor is being charged for voltage doubling.

According to another embodiment, in order to accommodate for the limited time available during a time slot when the magnetron is not emitting, a frequency dependent measurement may be obtained by cutting the frequency dependent measurement in several parts (e.g., in several frequency ranges of smaller size). For example, the SSMG may be activated at a first frequency during a first time slot, at a second frequency during a second time slot, . . . , at a $X^{th}$ frequency during a $X^{th}$ time slot and repeatedly so until a complete scan in frequency has been obtained.

Figure 5:
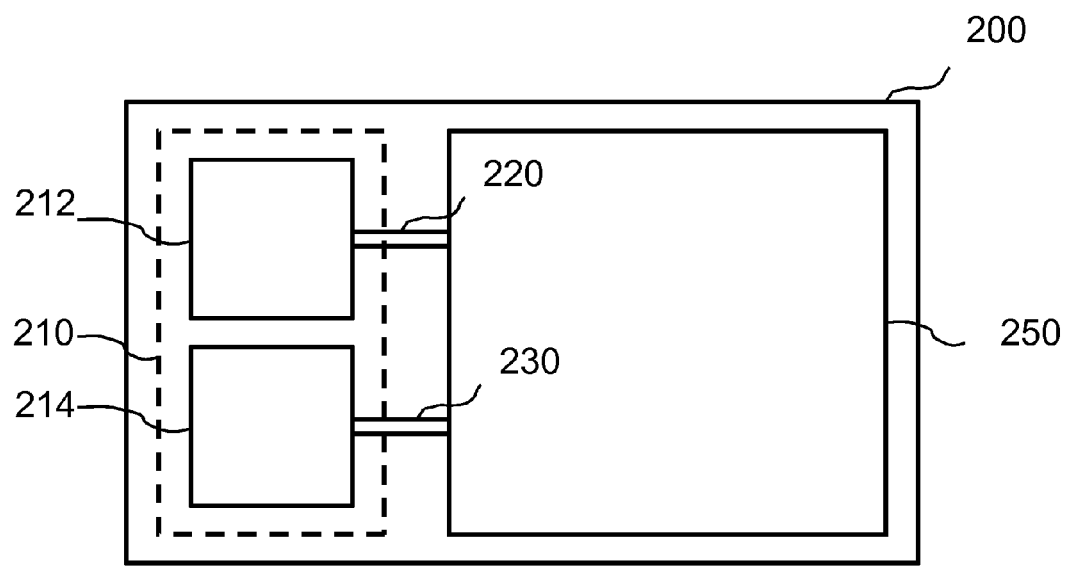
FIG. 5 is a schematic block diagram of a microwave oven according to an exemplifying embodiment of the present invention.

Referring now to FIG. 5, there is shown a schematic block diagram of a microwave oven 200 according to an exemplifying embodiment of the present disclosure. The microwave oven 200 comprises a microwave generator 210 comprising a magnetron 212 and an SSMG 214. The microwave oven comprises a cavity 250 that can receive a load (not shown in FIG. 5) to be heated in the microwave oven 200. According to the embodiment depicted in FIG. 5, each of the magnetron 212 and the SSMG 214 is connected to the cavity 250 via dedicated feeding structures 220 and 230 for guiding microwaves generated by the magnetron 212 and the SSMG 214, respectively, to the cavity 250 of the microwave oven 200. The microwave oven may comprise a dedicated feeding structure for microwaves generated by the SSMG, and a separate dedicated feeding structure for microwaves generated by the magnetron. Such feeding structures 220, 230 may for example comprise one or more waveguides or transmission lines, for example constituted by a coaxial cable. As described in the foregoing, the microwaves generated by the SSMG 214 are intended for sensing purposes, while the microwaves generated by the magnetron 212 are intended for heating purposes. By having dedicated feeding structures for the SSMG and the magnetron, respectively, the feeding ports for heating purposes can be positioned independently of the feeding ports for sensing purposes. The sensing capabilities using the SSMG can be optimized for its particular purpose, while at the same time the heating capabilities using the magnetron can be optimized independently. However, in some embodiments, the same feeding structures and feeding ports may be used for both heating and sensing purposes.

Figure 6:
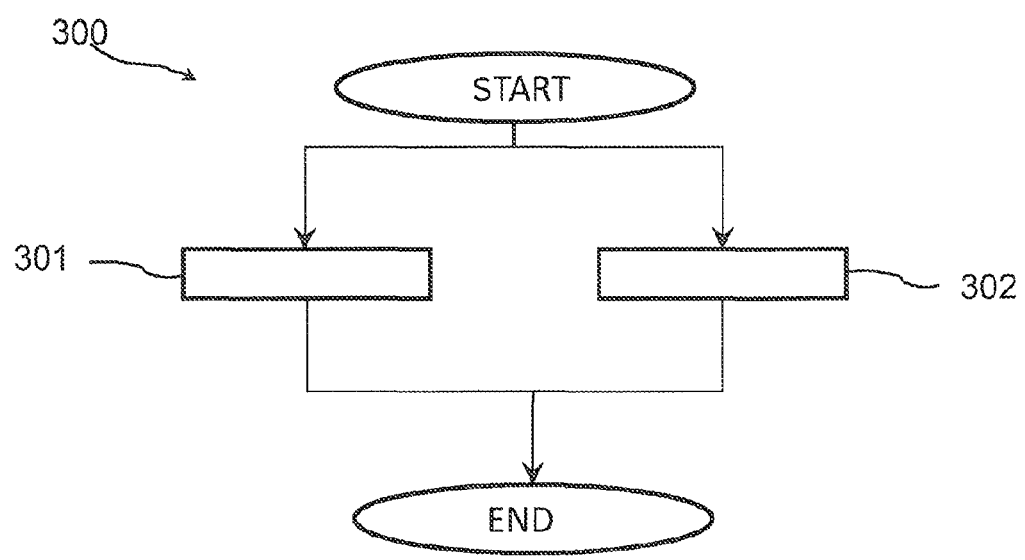
FIG. 6 is a schematic flow diagram of a method of operating a microwave oven according to an exemplifying embodiment of the present invention.

Referring now to FIG. 6, there is shown a schematic flow diagram of a method 300 of operating a microwave oven according to an exemplifying embodiment of the present disclosure.

At step 301, a magnetron provides microwave power for heating a load disposed in the microwave oven.

At step 302, an SSMG provides microwave power for sensing presence and/or determining nature of the load in the microwave oven.

The sequence order for operation of the microwave oven is to initially activate the SSMG (step 302) for sensing presence of a load in the microwave oven. If no load is detected, the magnetron will then not be switched on as operation of a magnetron in an empty microwave oven may damage the magnetron itself due to the high level of reflected microwave power. Alternatively, if no load is detected, the magnetron may be switched on during a limited period of time (for example in the order of about one minute) since no detection of the load may be due to the fact that the load is too small and heating of the small load may still be desired. However, if a load is sensed, the magnetron will be activated for heating the load (step 301). It should be noted that, at the initial step 302 of activation of the SSMG, both presence and nature of the load may be determined. The magnetron is then operated in accordance with the nature of the load. Parameters, such as duration of the operation cycle and duty cycle of the magnetron, are adjusted accordingly. Further, as described in the foregoing, the SSMG may be activated (step 302) during an ongoing heating cycle to determine the current nature of the load and, as a result, adjust the operating parameters of the magnetron (e.g. the duty cycle).

Figure 7:
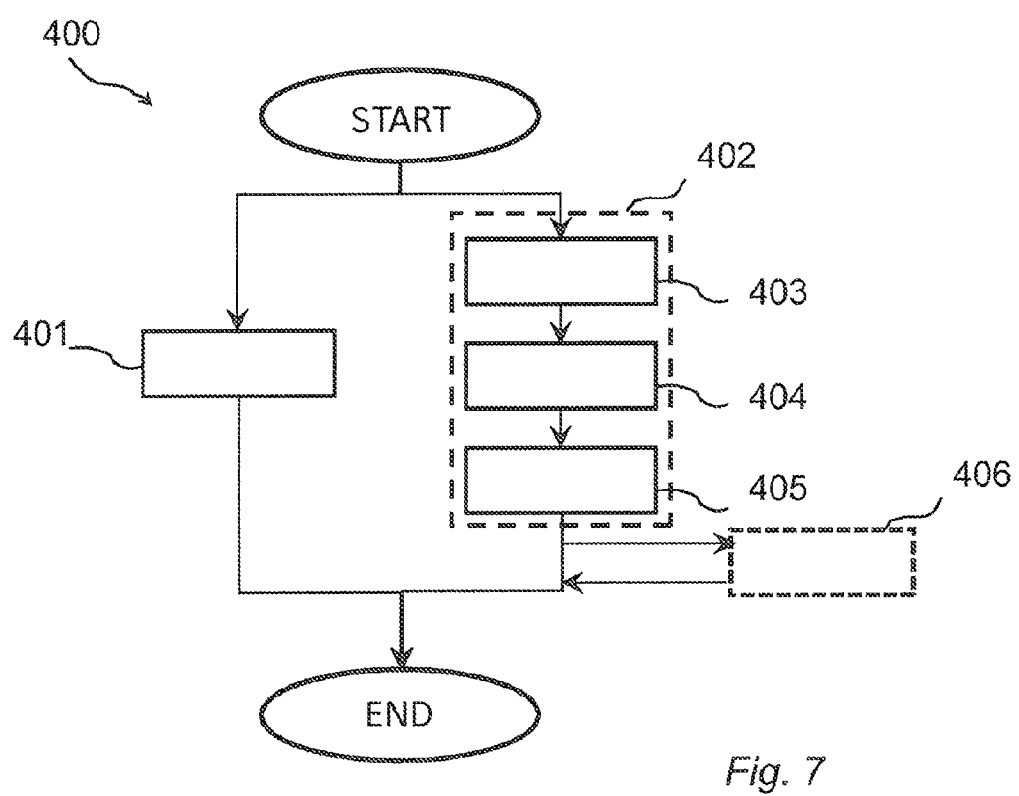
FIG. 7 is a schematic flow diagram of a method of operating a microwave oven according to another exemplifying embodiment of the present invention.

FIG. 7 shows a schematic flow diagram of a method 400 of operating a microwave oven according to an exemplifying embodiment of the present disclosure.

At step 401, a magnetron provides microwave power for heating a load disposed in the microwave oven.

At step 402, an SSMG provides microwave power for sensing presence and/or determining nature of the load in the microwave oven.

In turn, step 402 comprises the steps 403-405. At step 403, the SSMG provides microwave power such as to feed microwaves into a cavity arranged in the microwave oven, in which cavity the load can be disposed.

At step 404, a measuring unit measures a signal reflected from the interior of the cavity and/or a resulting microwave field inside the cavity to produce a measurement signal.

At step 405, a processing unit compares the measurement signal with a load reference signal data set, and, based on the comparison, produces an indication of presence and/or nature of the load. The load reference signal data set is a data set comprising a plurality of reference signals for typical (or known) loads. Storing of these reference signals may be implemented in some kind of library or look-up table. The measurement signal obtained after activation of the SSMG may then be mapped against the reference signals of the data set. As a result, parameters for operation of the magnetron may be either directly extracted or obtained by interpolation from the library. For example, if a load consisting of 400 g frozen meat is arranged in the cavity, either the measurement signal representative of such a load is already comprised in the library and the operating parameters are directly extracted or measurement signals for loads consisting of, e.g., 300 g and 500 g frozen meat are comprised in the library and the operating parameters for the magnetron can be obtained by interpolation.

A plurality of measurement signals may be obtained for different frequency settings of the SSMG in order to improve the load sensing accuracy. The load reference signal data set may comprise frequency dependent reference data, thus making an additional parameter available for determining the presence and/or nature of the load in the cavity.

Optionally, the processing unit may compare the measurement signal with the load reference signal data set, and, based on the comparison, produce a signal indicative of presence and/or nature of the load.

In addition or alternatively, the processing unit may compare the measurement signal with an earlier measurement signal, e.g., the initial measurement signal (i.e., the measurement signal obtained at start), for determining the nature of the load in the cavity.

The indication of presence and/or nature of the load, or the signal indicative of presence and/or nature of the load, may subsequently be utilized in order to control the operation of the microwave oven, either manually by user input or automatically by changing operating parameters.

The method 400 may comprise a step 406 comprising adjusting one or more of a set of parameters for controlling operation of the microwave oven, on the basis of the determined indication of presence and/or nature of the load.

The set of parameters may comprise one or more of frequency, phase and power of the magnetron, and the duty cycle and heating cycle timing parameters of the microwave oven.

With reference to FIGS. 6 and 7, any one of steps 302 and 402 may comprise the SSMG providing microwave power during time periods when there is no microwave output from the magnetron. That is, the SSMG may provide microwave power during a time period of magnetron operation cycle in which the magnetron is idle. Alternatively or additionally, the SSMG may provide microwave power during half mains periods when there is no emission from the magnetron.

Figure 8:
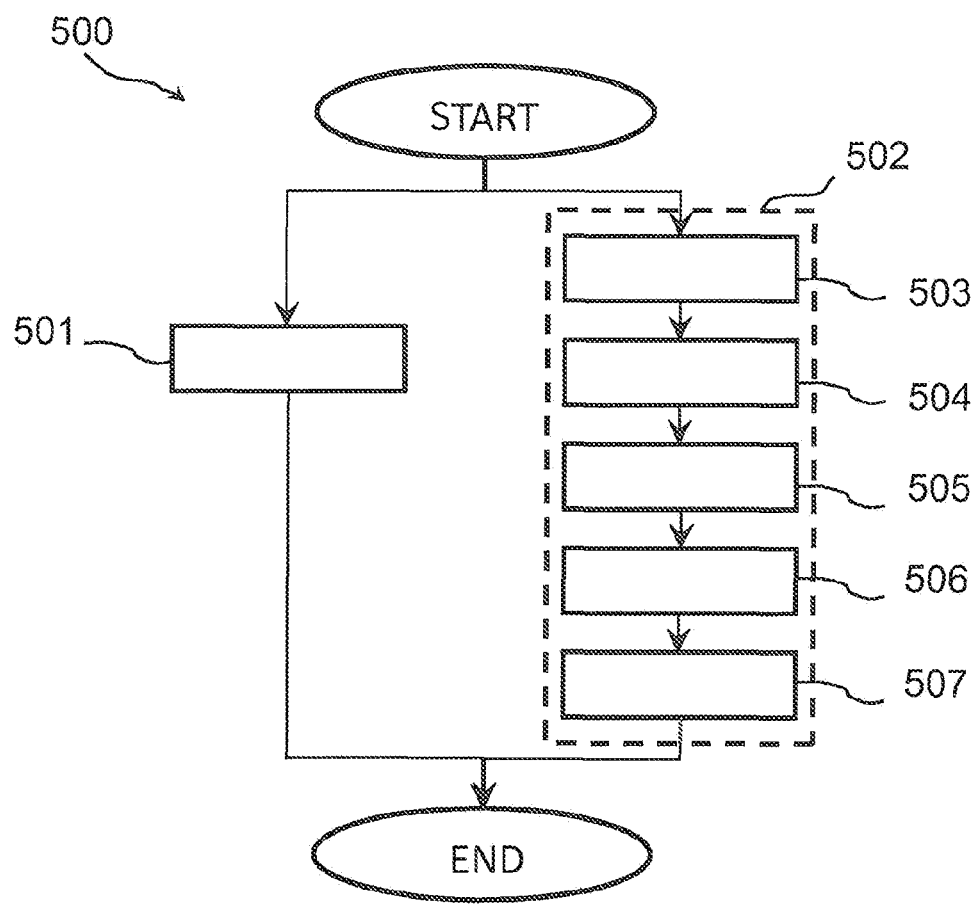
FIG. 8 is a schematic flow diagram of a method of operating a microwave oven according to another exemplifying embodiment of the present invention.

FIG. 8 shows a schematic flow diagram of a method 500 of operating a microwave oven according to an exemplifying embodiment of the present disclosure. This method lets a user associate one or more parameters for controlling operation of the microwave oven with a particular type and/or quantity of load. The method includes the steps of receiving user input of one or more parameters for controlling operation of the microwave oven; operating the SSMG to provide microwave power into a cavity of the microwave oven; measuring microwave power reflected from the cavity and/or a resulting microwave field inside the cavity during operation of the SSMG to obtain a measurement signal; associating the measurement signal with said one or more parameters; and storing said one or more parameters and the associated measurement signal in a load reference signal data set. Once the association has been made between said parameters and the particular type and/or quantity of load, the same parameters can be set automatically when that type and/or quantity of load is sensed.

As an example, this method may be performed as outlined below. At step 501, a magnetron provides microwave power for heating a load disposed in the microwave oven.

At step 502, an SSMG provides microwave power for sensing presence and/or determining nature of the load in the microwave oven.

In turn, the step 502 includes steps 503-507. At step 503, the SSMG provides microwave power such as to feed microwaves into a cavity arranged in the microwave oven, in which cavity the load can be disposed.

At step 503, a user selects one or more parameters for controlling operation of the microwave oven via a user interface.

At step 504, a measuring unit measures a signal reflected from the interior of the cavity.

At step 505, a processing unit (or, alternatively, the measuring unit) converts the reflected signal into an electric signal.

At step 506, the processing unit associates the electric signal with the one or more parameters for controlling operation of the microwave oven selected at step 503.

At step 507, a value of the electric signal and the one or more parameters for controlling operation of the microwave oven selected at step 503 are stored in a memory unit disposed in the microwave oven.

By the exemplifying method 500, a user can store operation parameters for controlling operation of the microwave oven in a memory unit comprised in the microwave oven, for, e.g., defining a heating cycle of the microwave oven for a particular type of load, such as for a type of load that is frequently heated in the microwave oven.

After the one or more operation parameters have been stored as described with reference to FIG. 8, the parameters may be recalled prior to or during an ongoing heating cycle of the microwave oven by means of operation of the SSMG as described in the foregoing, and subsequently be utilized to adapt the operation of the microwave oven to the particular type of load disposed in the microwave oven, for example to adapt the heating cycle of the microwave oven to the particular type of load that is disposed in the microwave oven.

With reference to FIG. 8, the step 502 may comprise the SSMG providing microwave power during time periods when there is no microwave output from the magnetron. For example, the SSMG may provide microwave power during a time period of magnetron operation cycle in which the magnetron is idle. Alternatively or additionally, the SSMG may provide microwave power during a half mains period when there is no emission from the magnetron.

While this disclosure has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

We claim:

1. A method of operating a microwave oven comprising:
   operating a magnetron to provide microwave power for heating a load disposed in the microwave oven; and
   providing microwave power, during a time period when there is no microwave output from the magnetron, with a solid-state microwave generator for sensing a presence or determining a nature of the load in the microwave oven; and
   synchronizing a duration of pulses of microwave power provided by the solid-state microwave generator with time periods during which there is no microwave output from the magnetron.

2. The method according to claim 1, comprising the steps of:
   operating the solid-state microwave generator to provide microwave power into a cavity of the microwave oven;
   measuring microwave power reflected from the cavity or a resulting microwave field inside the cavity during operation of the solid-state microwave generator to obtain a measurement signal;
   comparing the measurement signal with a load reference signal data set to produce a comparison result; and
   producing an indication of the presence or the nature of the load in the cavity based on the comparison result.

3. The method according to claim 2, further comprising obtaining a plurality of measurement signals for different frequency settings of the solid-state microwave generator, and comparing the measurement signals to a frequency dependent load reference signal data set.

4. The method according to claim 2, further comprising comparing a measurement signal obtained by operation of the solid-state microwave generator with an earlier measurement signal for determining the nature of the load.

5. The method according to claim 2, further comprising adjusting one or more of a set of parameters for controlling operation of the magnetron based on an indication of the presence or the nature of the load.

6. The method according to claim 1, further comprising the steps of:
   receiving user input of one or more parameters for controlling operation of the microwave oven;
   operating the solid-state microwave generator to provide microwave power into a cavity of the microwave oven;
   measuring microwave power reflected from the cavity or a resulting microwave field inside the cavity during operation of the solid-state microwave generator to obtain a measurement signal;
   associating the measurement signal with said one or more parameters to establish an associated measurement signal; and storing said one or more parameters and the associated measurement signal in a load reference signal data set.

7. The method according to claim 6, further comprising operating the solid-state microwave generator as an initial step in a heating cycle of the microwave oven.

8. A method of operating a microwave oven comprising:
operating a magnetron to provide microwave power for heating a load disposed in the microwave oven; and
providing microwave power with a solid-state microwave generator for sensing a presence or determining a nature of the load in a microwave oven during a half mains period when there is no current through the magnetron and during a time period when there is no microwave output from the magnetron.

9. The method according to claim 8, comprising the steps of:
operating the solid-state microwave generator to provide microwave power into a cavity of the microwave oven;
measuring microwave power reflected from the cavity or a resulting microwave field inside the cavity during operation of the solid-state microwave generator to obtain a measurement signal;
comparing the measurement signal with a load reference signal data set to produce a comparison result; and
producing an indication of the presence or the nature of the load in the cavity based on the comparison result.

10. The method according to claim 9, further comprising obtaining a plurality of measurement signals for different frequency settings of the solid-state microwave generator, and comparing the measurement signals to a frequency dependent load reference signal data set.

11. The method according to claim 9, further comprising comparing a measurement signal obtained by operation of the solid-state microwave generator with an earlier measurement signal for determining the nature of the load.

12. The method according to claim 9, further comprising adjusting one or more of a set of parameters for controlling operation of the magnetron based on an indication of the presence or the nature of the load.

13. The method according to claim 8, further comprising the steps of:
receiving user input of one or more parameters for controlling operation of the microwave oven;
operating the solid-state microwave generator to provide microwave power into a cavity of the microwave oven;
measuring microwave power reflected from the cavity or a resulting microwave field inside the cavity during operation of the solid-state microwave generator to obtain a measurement signal;
associating the measurement signal with said one or more parameters to establish an associated measurement signal; and
storing said one or more parameters and the associated measurement signal in a load reference signal data set.

14. The method according to claim 13, further comprising operating the solid-state microwave generator as an initial step in a heating cycle of the microwave oven.

15. A microwave oven, comprising:
a magnetron for providing microwave power to heat a load disposed in the microwave oven, and
a solid-state microwave generator for providing microwave power to sense a presence or determine a nature of the load in the microwave oven wherein the solid-state microwave generator is configured to provide microwave power during a time period when there is no microwave output from the magnetron and such that a duration of pulses of the microwave power is synchronized with time periods during which there is no microwave output from the magnetron.

16. The microwave oven according to claim 15, further comprising
a measuring unit;
a processing unit; and
a cavity in which the load can be received;
the solid-state microwave generator being configured to provide microwave power into the cavity;
the measuring unit being configured to measure microwave power reflected from the cavity or a resulting microwave field inside the cavity to produce a measurement signal; and
the processing unit being configured to compare the measurement signal with a load reference signal data set and produce an indication of the presence or the nature of the load.

17. The microwave oven according to claim 16, further comprising a control unit configured to adjust one or more of a set of parameters for controlling operation of the magnetron based on the indication of the presence or the nature of the load.

18. A microwave oven, comprising:
a magnetron for providing microwave power to heat a load disposed in the microwave oven, and
a solid-state microwave generator for providing microwave power to sense a presence or determine a nature of the load in the microwave oven, wherein the solid-state microwave generator is configured to provide microwave power during a half mains period during which there is no current through the magnetron and during a time period when there is no microwave output from the magnetron.

19. The microwave oven according to claim 18, further comprising
a measuring unit;
a processing unit; and
a cavity in which the load can be received;
the solid-state microwave generator being configured to provide microwave power into the cavity;
the measuring unit being configured to measure microwave power reflected from the cavity or a resulting microwave field inside the cavity to produce a measurement signal; and
the processing unit being configured to compare the measurement signal with a load reference signal data set and produce an indication of the presence or the nature of the load.

20. The microwave oven according to claim 19, further comprising a control unit configured to adjust one or more of a set of parameters for controlling operation of the magnetron based on the indication of the presence or the nature of the load.

* * * * *